(12) United States Patent
Shinohara et al.

(10) Patent No.: US 6,321,284 B1
(45) Date of Patent: Nov. 20, 2001

(54) MULTIPROCESSOR SYSTEM WITH MULTIPLE MEMORY BUSES FOR ACCESS TO SHARED MEMORIES

(75) Inventors: Akio Shinohara; Hideo Abe; Katsuichi Ohara, all of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/268,426

(22) Filed: Mar. 12, 1999

(30) Foreign Application Priority Data

Jul. 27, 1998 (JP) .................................................. 10-210729

(51) Int. Cl.[7] .......................... G06F 13/36; G06F 13/362
(52) U.S. Cl. ........................ 710/113; 710/107; 710/119; 710/240; 711/147
(58) Field of Search .......................... 710/107, 113–125, 710/240–244, 8–19; 711/147–151

(56) References Cited

U.S. PATENT DOCUMENTS

| 5,202,973 | * | 4/1993 | Ramanujan et al. | .................. 711/147 |
| 5,367,678 | * | 11/1994 | Lee et al. . | |
| 5,375,215 | * | 12/1994 | Hanawa et al. . | |
| 5,634,037 | * | 5/1997 | Sasaki et al. | ......................... 711/152 |
| 5,649,184 | * | 7/1997 | Hayashi et al. | .......................... 707/8 |
| 5,765,036 | * | 6/1998 | Lim | ....................................... 711/147 |
| 6,161,168 | * | 12/2000 | Kametani | ............................. 711/147 |

FOREIGN PATENT DOCUMENTS

| 58-176762 | | 10/1983 | (JP) . |
| 4-250553 | | 9/1992 | (JP) . |
| 04250553A | * | 9/1992 | (JP) . |
| 5-274255 | | 12/1993 | (JP) . |

* cited by examiner

*Primary Examiner*—Rupal Dharia
(74) *Attorney, Agent, or Firm*—Rosenman & Colin, LLP

(57) ABSTRACT

A data processing system having one or more processor modules and a plurality of shared memory busses to increase its total system performance. Processor modules send bus requests to a bus arbiter, when they attempt to make access to shared memories or memory-mapped peripheral control modules. When such memory access requests are received, the bus arbiter checks the availability of each bus that will be used to reach the requested memories, and send bus grant signals to the requesting processor modules after resolving conflicts, if any. Since the system provides separate paths to reach the individual shared memories, two or more processor modules can be granted their access requests at the same time.

3 Claims, 9 Drawing Sheets

|  | req4 | req3 | req2 | req1 |
|---|---|---|---|---|
| address1 | 1 | 0 | 0 | 0 |
| address2 | 0 | 1 | 0 | 0 |
| address3 | 0 | 0 | 1 | 0 |
| address4 | 0 | 0 | 0 | 1 |

FIG. 6

MULTIPROCESSOR SYSTEM WITH MULTIPLE MEMORY BUSES FOR ACCESS TO SHARED MEMORIES

BACKGROUND OF THE INVENTION

1. Field of the Invention

The present invention relates to a data processing system, and more particularly to a data processing system having one or more processor modules.

2. Description of the Related Art

Data processing systems having a plurality of processor modules, each containing a central processing unit (CPU) and other electronic devices, can be broadly =divided into two types in terms of their memory configurations. One is called "symmetric systems," in which a plurality of processor modules are configured to exchange information via a common shared memory; the other is called "asymmetric systems," in which individual processing modules have their own memories. The former type (i.e., symmetric systems) is currently the mainstream architecture.

In symmetric data processing systems, processor modules are connected to a single, time-sharing memory bus, which is shared by two or more processor modules, but can be used by one processor at a time, microscopically. Each processor is allowed to occupy the bus for a limited time period, which can be a bottleneck in the scalability of the system. That is, with this conventional symmetric architecture, the system's total performance would not increase in proportion to the number of processor modules, because of the limitation in its shared bus access.

Bus arbitration mechanisms play an inevitable role in the symmetric data processing systems to arbitrate concurrent requests from two or more processor modules and appropriately allocate bus resources to them. The number of processor modules, on the other hand, may change in accordance with the system's cost and performance requirements. It is preferable that the system can be flexibly reconfigured by adding or removing optional processor modules. In the extreme case, such a system can even operate with only one processor module. The above-described conventional bus arbitration mechanism still works as usual in such a single module system. However, bus arbitration is not necessary in this particular situation; rather, it causes an adverse effect to the system performance because it adds a delay to each cycle of shared memory access.

SUMMARY OF THE INVENTION

Taking the above into consideration, an object of the present invention is to provide a data processing system having one or more processor modules with reduced bus traffic loads to improve the total system performance.

To accomplish the above object, according to the present invention, there is provided a data processing system comprising the following elements: (a) one or more processor modules, each having a processor for executing a program; (b) a plurality of memories which are respectively mapped onto a plurality of areas defined in a memory space; (c) a plurality of buses disposed between the processor modules and the memories, each allowing the processor modules to make access to at least one of the memories; and (d) a bus arbiter which accepts access requests from the processor modules to the memories, checks the availability of each bus that should be used to reach the requested memories, and grants the access requests.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram which shows memory addresses and stored data words of an FIFO memory shown in FIG. 5;

DESCRIPTION OF THE PREFERRED EMBODIMENTS

Two embodiments of the present invention will be described below with reference to the accompanying drawings.

Figure 1:
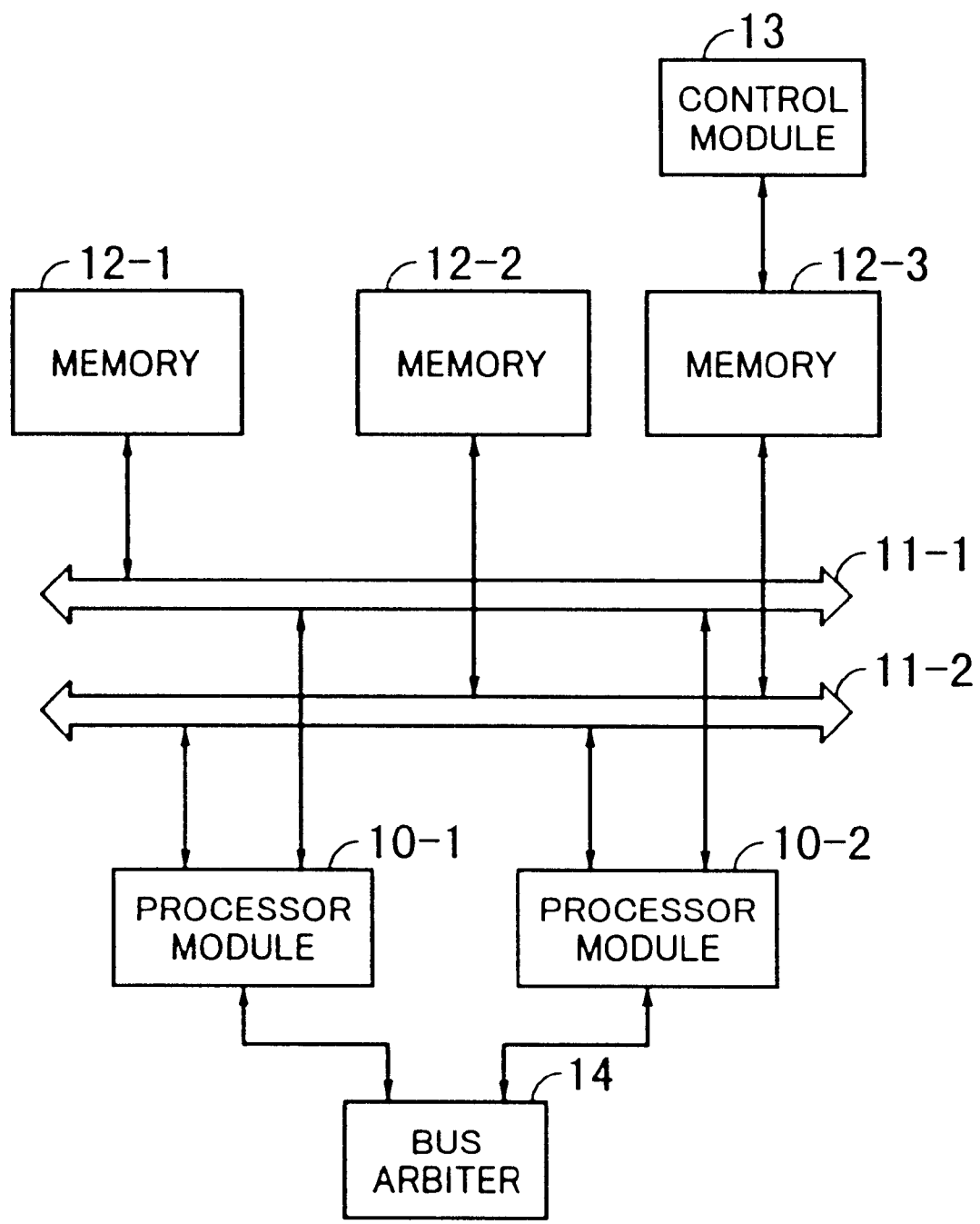
FIG. 1 is a conceptual view of the present invention.

FIG. 1 shows the concept of a data processing system according to the present invention. In this system, two processor modules 10-1 and 10-2, each comprising a CPU and other electronic devices, perform various computational operations, in addition to providing control functions for other part of the system. The system has two bus 11-1 and 11-2 to connect the processor modules 10-1 and 10-2 with three memories 12-1 to 12-3, permitting them to exchange information. The memories 12-1 to 12-3 are ROM (Read Only Memory) and/or RAM (Random Access Memory) devices. They are used as main storage for basic software programs that the processor modules 10-1 and 10-2 execute, or as temporary data/program storage for their computational operations.

Figure 2:
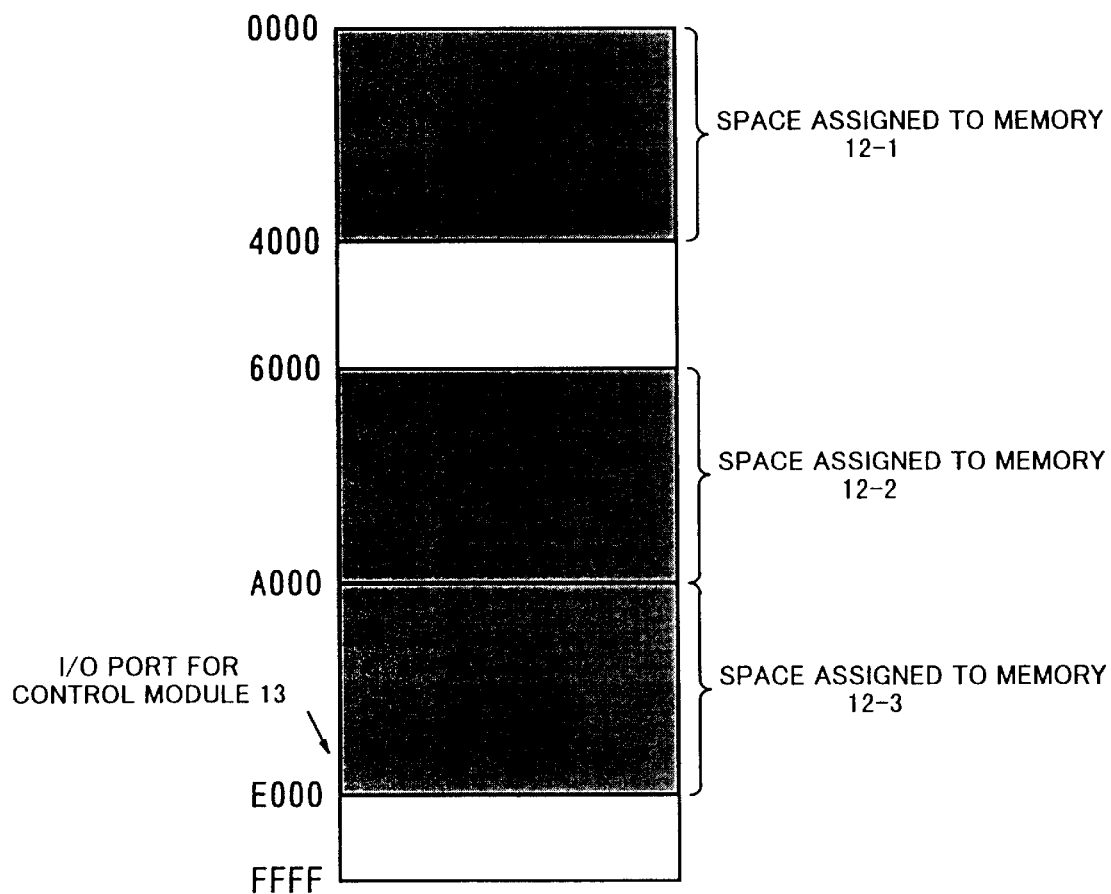
FIG. 2 is a diagram which presents an example of space mapping of shared memories shown in FIG. 1.

FIG. 2 presents an example of memory space mapping in the data processing system of FIG. 1. FIG. 2 shows that this virtual memory space has a total address range of 0000 to FFFF in hexadecimal notation, where three areas 0000–4000, 6000–A000, and A000–E000 are occupied by the memory devices. More specifically, the first memory 12-1 is mapped on the first area 0000–4000; the second memory 12-2 on the second area 6000–A000; the third memory 12-3 on the third area A000–E000. The remaining areas 4000–6000 and E000–FFFF are left unused.

Referring back to FIG. 1, a control module 13 contains what is controlled by the system. The processor modules 10-1 and 10-2 transfer data to/from this control module 13 via a memory-mapped I/O port, which uses part of the space assigned to the memory 12-3 (see FIG. 2).

The data processing system has a bus arbiter 14 to arbitrate bus requests from the processor modules 10-1 and 10-2 wishing to use either bus 11-1 or 11-2. In accordance with predetermined rules, it processes the bus requests and returns bus grant signals to permit the use of available buses. The bus arbiter 14 manages access to those two buses 11-1 and 11-2 independently of each other. This means that concurrent requests from the processor modules 10-1 and 10-2 to different buses would be handled simultaneously.

The operation of the system of FIG. 1 will now be described below in more detail.

Suppose, for example, that the processor module 10-1 is attempting to make access to the memory 12-1. It first sends a bus request to the bus arbiter 14, demanding permission to use the bus 11-1 in an attempt to reach the memory 12-1. If the bus 11-1 is available (i.e., not occupied by any other processor module) at this instant in time, the bus arbiter 14 grants the bus request of the processor module 10-1. The requesting processor module 10-1 can then make access to the memory 12-1 via the bus 11-1.

Likewise, when the other processor module 10-2 needs to read or write the memory 12-2, it should first send a bus request to the bus arbiter 14 to demand permission to use the bus 11-2 through which it can reach the memory 12-2. If the bus 11-2 is available at this instant in time, the bus arbiter 14 grants the bus request, thus permitting the processor module 10-2 to make access to the memory 12-2 via the bus 11-2.

As mentioned earlier, the bus arbiter 14 manages access to the two buses 11-1 and 11-2 independently, so that concurrent bus requests from the processor modules 10-1 and 10-2 to different busses can be accepted in a parallel manner. For example, consider such a situation where the processor module 10-1 requests the bus 11-1, and concurrently, the other processor module 10-2 requests the other bus 11-2. In this case, the bus arbiter 14 will grant the both bus requests immediately, because they do not conflict with each other. Therefore, the two processor modules 10-1 and 10-2 can make access to their desired memories 12-1 and 12-2 almost at the same time, and with no wait.

In the case that the two processor modules 10-1 and 10-2 request the same bus, the access right is granted to either of them which issued the bus request earlier, and the other processor module should wait accordingly. In other words, the bus arbiter processes the bus requests on a first-come first-served basis. If two bus requests are asserted at exactly the same time, the bus arbiter 14 will grant access permission in an orderly manner, according to the priority levels that are previously assigned to the individual processor modules.

As described above, the present invention proposes such a data processing system that comprises: (a) one or more processor modules each having a CPU for program execution; (b) a plurality of memories being respectively mapped onto a plurality of areas defined in a memory space; (c) a plurality of buses disposed between the processor modules and the memories, each allowing the processor modules to make access to at least one of the memories; and (d) a bus arbiter which accepts access requests from the processor modules to the memories, checks the availability of each bus that should be used to reach the requested memories, and grants the access requests. This system configuration will reduce the traffic load of each bus, because the processor modules are expected to use different busses to make access to different portions of their shared memory space. As a result, the total performance of this system will be increased.

Figure 3:
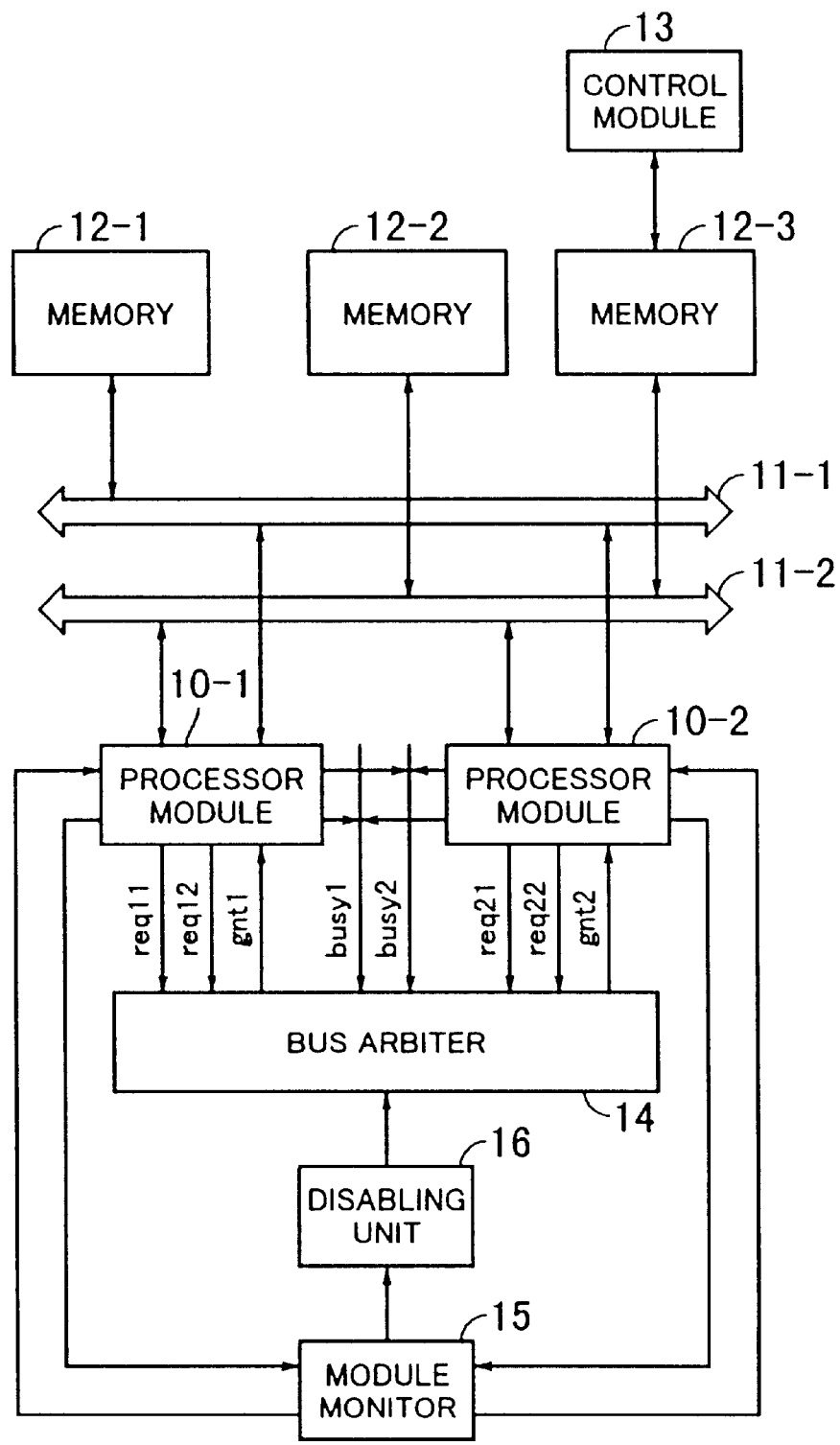
FIG. 3 is a block diagram of a data processing system according to a first embodiment of the present invention.

Referring next to FIG. 3, the following section will describe a first embodiment of the present invention. Since the system illustrated in FIG. 3 shares some elements with that described earlier in FIG. 1, the following section will focus on its distinctive points, while affixing like reference numerals to like elements.

This system employs a module monitor 15 to detect the presence of each processor module and a disabling unit 16 to control the bus arbiter 14 according to the module presence information. That is, the module monitor 15 monitors whether each processor module is mounted on the circuit board, and if a particular processor module is found absent, it informs the other existing processor module and the disabling unit 16 of the absence of that module. In response to this information, the disabling unit 16 disables a relevant part of the bus arbiter 14.

The detection of processor modules can be accomplished with, for example, mechanical switches each attached to, or placed near by, the module sockets on which the processor modules 10-1 and 10-2 are mounted. When a processor module is mounted, its corresponding mechanical switch will be actuated (e.g., turned on), allowing the module monitor 15 to detect the presence of the processor module.

The processor module 10-1 activates its bus request signal "zreql1" when it requests the bus arbiter 14 to permit the use of the bus 11-1. Another bus request signal "req12" is activated when the processor module 10-1 requests the bus 11-2. Likewise, bus request signals "req21" and "req22" are activated by the other processor module 10-2 when it requests the use of the buses 11-1 and bus 11-2, respectively.

A bus grant signal "gnt1" is activated by the bus arbiter 14 to inform the processor module 10-1 that its bus request signal rzq11 or req12 has been granted. Similarly, another bus grant signal "gnt2" is activated by the bus arbiter 14 to inform the processor module 10-2 that its bus request signal req21 or req22 has been granted. Further, bus busy signals "busy1" and "busy2" are asserted by the bus arbiter 14 when the buses 11-1 and 11-2 are being used (i.e., busy), respectively.

Figure 4:
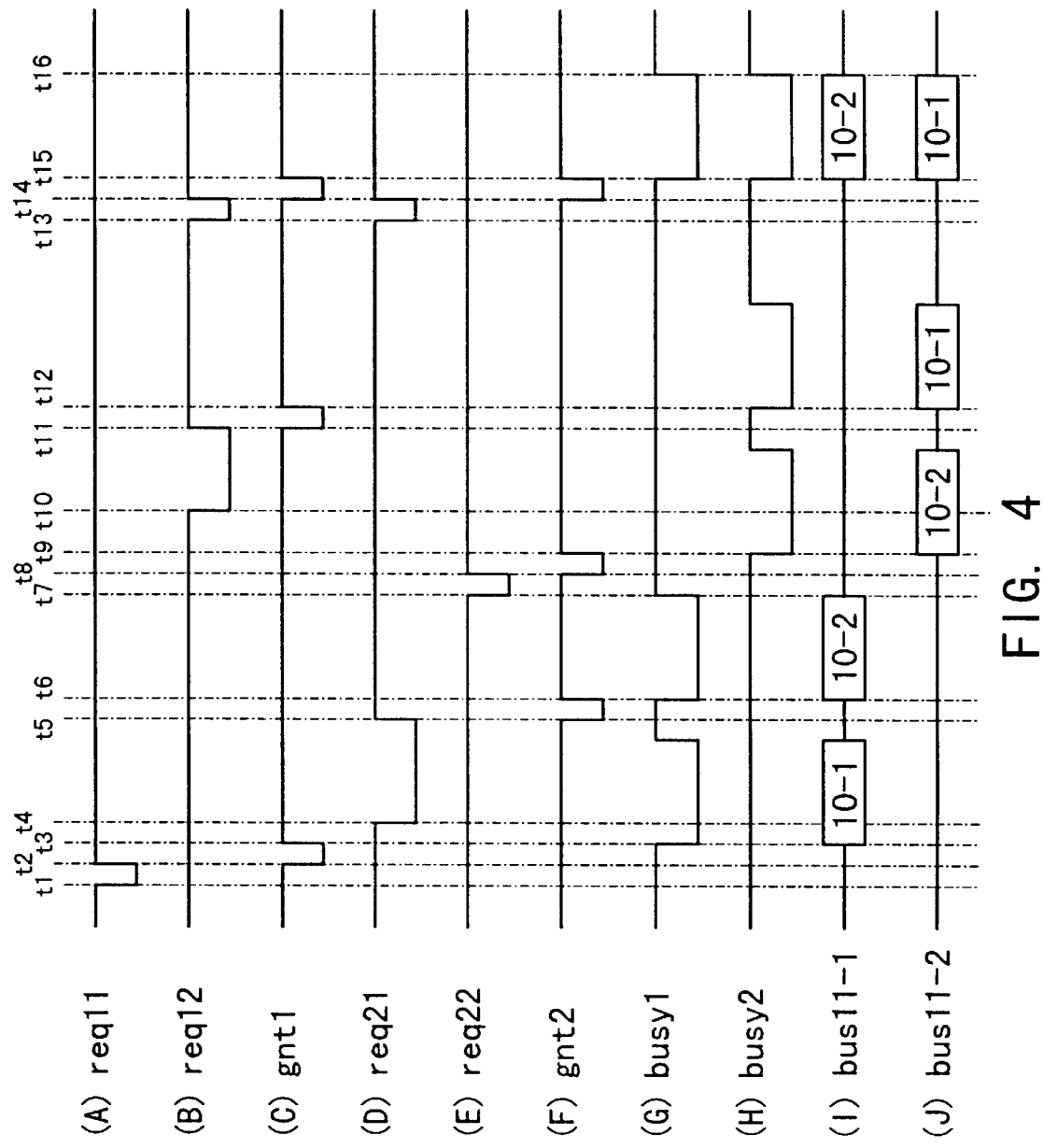
FIG. 4 is a timing diagram which shows typical activities of main signals in the system of FIG. 3.

Referring now to FIG. 4, the next section will describe how the system of the first embodiment operates.

FIG. 4 is a timing diagram which shows typical activities of main signals in the system of FIG. 3. The above-described arbitration control signals are shown in FIG. 4, with symbols (A) to (H). Note that all those signals are "active low" signals, meaning that they are driven to low levels when activated (or asserted), and stay at high levels when deactivated (or negated).

At time t1, the processor module 10-1 asserts its own bus request signal rzq11 (A) in an attempt to get an access right to the bus 11-1. In response to this request, the bus arbiter 14 asserts the bus grant signal gnt1 (C) at time t2, since the bus 11-1 is available and the other processor module 10-2 is not requesting the same bus. Accordingly, at time t3, the processor module 10-1 activates the bus busy signal busy1 (G) and then executes its intended bus cycle to read or write the memory 12-1 through the bus 11-1 as shown in (I). The other processor module 10-2 requests the same bus 11-1 at time t4, although the processor module 10-1 currently occupies it. This bus request, req21 (D) cannot be immediately accepted, but will be suspended by the bus arbiter 14 until the processor module 10-1 completes its bus cycle.

When the processor module 10-1 releases the bus 11-1, the bus arbiter 14 detects it and activates the next bus grant signal gnt2 (F) at time t5. Now that the processor module 10-2 has obtained the right to use the bus 11-1, it starts to read or write the memory 12-1 through the bus 11-1 (I) after asserting the bus busy signal busy1 (G) at time t6.

Next, the processor module 10-2 activates its bus request signal req22 (E) at time t7, in an attempt to make access to the bus 11-2. Because the bus 11-2 is available at that particular instant and the other processor module 10-1 is not requesting the same bus, the bus arbiter 14 asserts the bus grant signal gnt2 (F) at time t8. Accordingly, the processor module 10-2 activates the bus busy signal busy2 (H) at time t9, and then executes its bus cycle to read or write the memory 12-2 (or 12-3) via the bus 11-2 as shown in (J).

At time t10, the other processor module 10-1 requests the same bus 11-2, while the processor module 10-2 still occupies it. This bus request req12 (B) cannot be immediately accepted, but will be suspended by the bus arbiter 14 until the processor module 10-2 completes its bus cycle. When the processor module 10-2 releases the bus 11-2 at the end of its bus cycle, the bus arbiter 14 detects it and activates the bus grant signal gnt1 (C) at time t11. Now that the processor module 10-1 has obtained the right to use the bus 11-2, it starts to read or write the memory 12-2 (or 12-3) through the bus 11-2 (J) after asserting the bus busy signal busy2.

Subsequently, both processor modules 10-1 and 10-2 request the buses 11-2 and 11-1 at the same time t13 by asserting the bus request signals req12 (B) and req21 (D), respectively. Since these two requests do not conflict, the bus arbiter 14 simply activates the corresponding bus grant signals gnt1 and gnt2 to provide the processor modules 10-1 and 10-2 with the permission to use the buses 11-2 and 11-1, respectively. Accordingly, at time t15, the processor modules 10-1 and 10-2 establish their access rights to the buses 11-2 and 11-1 by asserting bus busy signals busy2 and busy1, respectively. The processor module 10-1 then makes access to the memory 12-2 (or 12-3) through the bus 11-2, and the processor module 10-2 makes access to the memory 12-1 through the bus 11-1.

The next section will explain how the system operates with only one processor module.

Suppose, for example, that the processor module 10-2 is removed. The module monitor 15 detects this event and informs the disabling unit 16 and the remaining processor module 10-1 of the removal. This information makes the disabling unit 16 disable the bus arbitration function of the bus arbiter 14. Further, the processor module 10-1 completely disables its interaction with the bus arbiter 14. Now that the bus arbitration has been totally deactivated, the processor module 10-1 can make access to any memories 12-1 to 12-3 by freely using the buses 11-1 and 11-2 without intervention of the bus arbiter 14. Because it is no longer necessary to execute the bus arbitration protocol to obtain bus access rights, the processor module 10-1 can process its tasks at a higher speed.

In the first embodiment described above, the memory space is divided into a plurality of subspaces, and the system is configured to have a plurality of busses being associated with the individual subspaces. While the multiprocessor environment may produce a high bus traffic in memory sharing, the proposed configuration spreads its traffic load to the plurality of busses, thus increasing total performance of the data processing system. Particularly when the system has only a single processor module, the module monitor detects the situation and disables bus arbitration. This also contributes to the enhancement of system performance.

Figure 5:
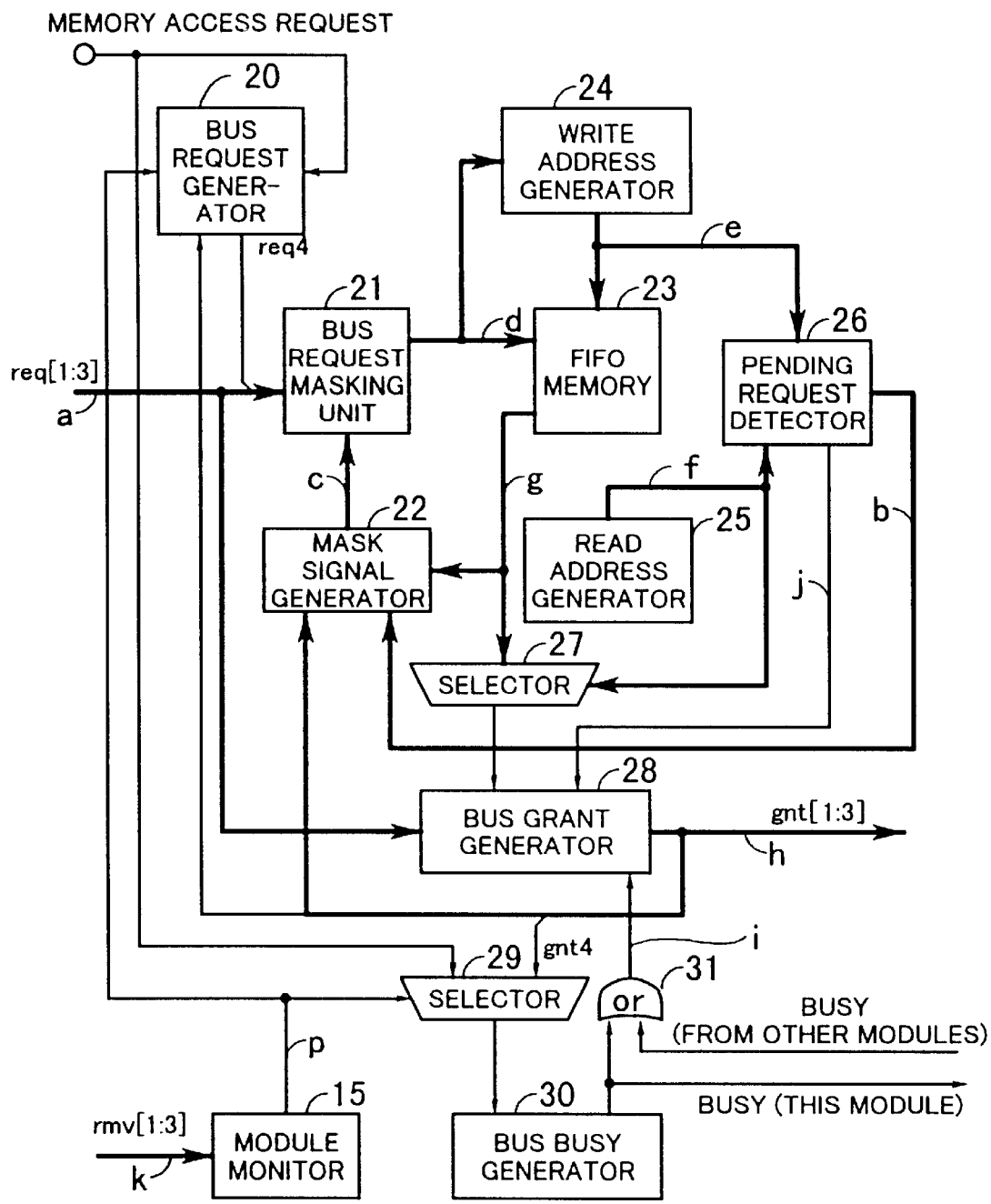
FIG. 5 is a block diagram of a bus arbiter according to a second embodiment of the present invention.

Referring next to FIG. 5, the following section will describe a second embodiment of the present invention. In this second embodiment, the data processing system comprises four processor modules P1 to P4 and four independent memory busses B1 to B4. FIG. 5 illustrates a bus arbiter integrated in the processor module P4 to control access requests to the bus B1. Since the arbitration of four busses should be performed independently, the processor module P4 has three more bus arbiters of the same kind to control the other busses B2, B3, and B4. The processor module P4 further contains a module monitor 15 and a disabling unit 16 described in FIG. 2. The other processor modules P1 to P3 send their respective bus request signals to the bus arbiter in the processor module P4, and assert their respective bus busy signals when their requests are granted.

The bus arbiter of FIG. 5 comprises a bus request generator 20, which is designed to assert a bus request signal req4 when the processor module P4 desires to make access to the bus B1. This bus request generator 20 is disabled when the module monitor 15 detects the absence of all the other processor modules P1 to P3. A bus request masking unit 21 receives the bus request signals req1 to req4 produced by the four processor modules P1 to P4 and supplies them to a FIFO memory 23 after applying an appropriate masking process under the control of a mask signal generator 22, not to enter again the same requests to the FIFO memory 23. More specifically, it suppresses such request signals that have already been entered into the FIFO memory 23, or whose corresponding bus grant signals gnt1 to gnt4 have already been asserted.

To make the above masking operation possible, the mask signal generator 22 produces request masking signals (c) from signals (b), (g), and (h). Here, the signals (b) are produced by the pending request detector 26 to indicate at which addresses of the FIFO memory 23 the bus requests are available. The signals (g) are produced by the FIFO memory 23 to show all data bits stored therein. These signals (b) and (g) are used to mask the request signals that have already been accepted and stored in the FIFO memory 23. The signals (h) are bus grant signals gnt1 to gnt4 produced by the bus grant generator 28. The mask signal generator 22 uses these signals to mask the request signals that have already been granted.

As FIG. 6 shows, the FIFO memory 23 has four addresses, each of which stores a 4-bit data word. The masked bus request signals req1* to req4* (d) are supplied to their corresponding bit inputs #1 to #4 of the FIFO memory 23 and stored into one of the four addresses that is specified by a write address generator 24. In the FIFO memory 23 of FIG. 6, each activated bus request signal is recorded as a bit having a value of "1." All those data stored in the FIFO memory 23 are supplied to the selector 27 and mask signal generator 22 through the signals (g). The name "FIFO memory" implies that this memory 23 serves as a "queue" to store some pending bus requests and output them in a first-in first-out fashion. Although the FIFO memory 23 is actually a simple 4x4 memory and has no inherent FIFO capabilities, the write address generator 24, read address generator 25, and selector 27 make it possible for the FIFO memory 23 to act as a FIFO queue as will be described below.

The write address generator 24 produces address signals (f) for writing a data word into the FIFO memory 23. This write address is incremented by one at each rising edge of the masked bus request signals (d), and after having reached its maximum value "4," it returns to "1" again. This means that the write address generator 24 produces a circular address that varies from "1" to "4." The read address generator 25, on the other hand, produces read address signals for a selector 27 to select a data word to be supplied to the bus grant generator 28. This read address is incremented by one at each active edge of the bus grant signals (h), and after having reached its maximum value "4," it returns to "1" again. That is, the read address is also a circular address ranging from "1" to "4."

The pending request detector 26 produces four signals (b) corresponding to the four individual addresses of the FIFO memory 23, which are activated when there is any pending bus request in the corresponding addresses. The pending request detector 26 produces another signal (j) to inform the bus grant generator 28 of the status of the FIFO memory 23. This status indication signal (j) is driven to "0" when the FIFO memory 23 is empty. The selector 27 extracts one of the four data words stored in the FIFO memory 23 whose address is specified by the read address signals (f) and supplies it to the bus grant generator 28.

The bus grant generator 28 is designed to issue bus grant signals in the following cases:

First, when the status indication signal (j) is "0" (i.e., no pending bus requests are present in the FIFO memory 23), and if the bus request signals (a) shows that there is one requester, the bus grant generator 28 will immediately activate a bus grant signal corresponding to that single requester.

Second, when the status indication signal (j) is "0," and if bus request signals (a) shows that there are two or more requesters, the bus grant generator 28 will activate a bus grant signal corresponding to one requester which has the smallest suffix number among others. Suppose, for example, that the request signals req1, req2, and req3 are activated at the same time.

The bus grant generator 28 will grant the bus request req1 by asserting its corresponding bus grant signal gnt1.

Third, when the status indication signal (j) indicates that at least one bus request is pending in the request queue (i.e., the FIFO memory 23), and if the output of the selector 27 shows that a single requester is waiting at the head of the queue (i.e., only one of four bits is in active state "1"), the bus grant generator 28 will activate a bus grant signal corresponding to that single requester.

Fourth, when the status indication signal (j) indicates that at least one bus request is pending in the request queue, and if the output of the selector 27 shows that two or more requesters are waiting at the head of the queue (i.e., two or more bits are in active state "1"), the bus grant generator 28 will grant the pending requests sequentially from the least significant bit (LSB) to the most significant bit (MSB) of the selector output, by activating their respective bus grant signals.

Before issuing a bus grant signal to each particular requester, the bus grant generator 28 checks whether its corresponding bus request signal is still in active state. If the bus request signal is not active, the bus grant generator 28 considers that the request has been withdrawn, and thus terminates the present arbitration cycle without asserting a bus grant signal.

A selector 29 selects either the bus grant signal gnt4 supplied from the bus grant generator 28 or the access request signal of the processor module P4. When the module monitor 15 detects the presence of at least one of the other three processor modules P1, P2, and P3, the selector 29 provides the bus busy generator 30 with the bus grant signal gnt4. Otherwise, the selector 29 selects the processor module P4's access request signal and supplies it the bus busy generator 30. When this selected signal becomes active, the bus busy generator 30 asserts its bus busy signal output to indicate that the processor module P4 has gained the right to access the bus. The bus arbiter of FIG. 5 receives bus busy signals from the other processor modules P1 to P3. A logical OR circuit 31 calculates a logic sum of all those bus busy signals and sends the result to the bus grant generator 28. This logical OR circuit 31 can alternatively be implemented as a simple wired OR circuit.

Figure 7:
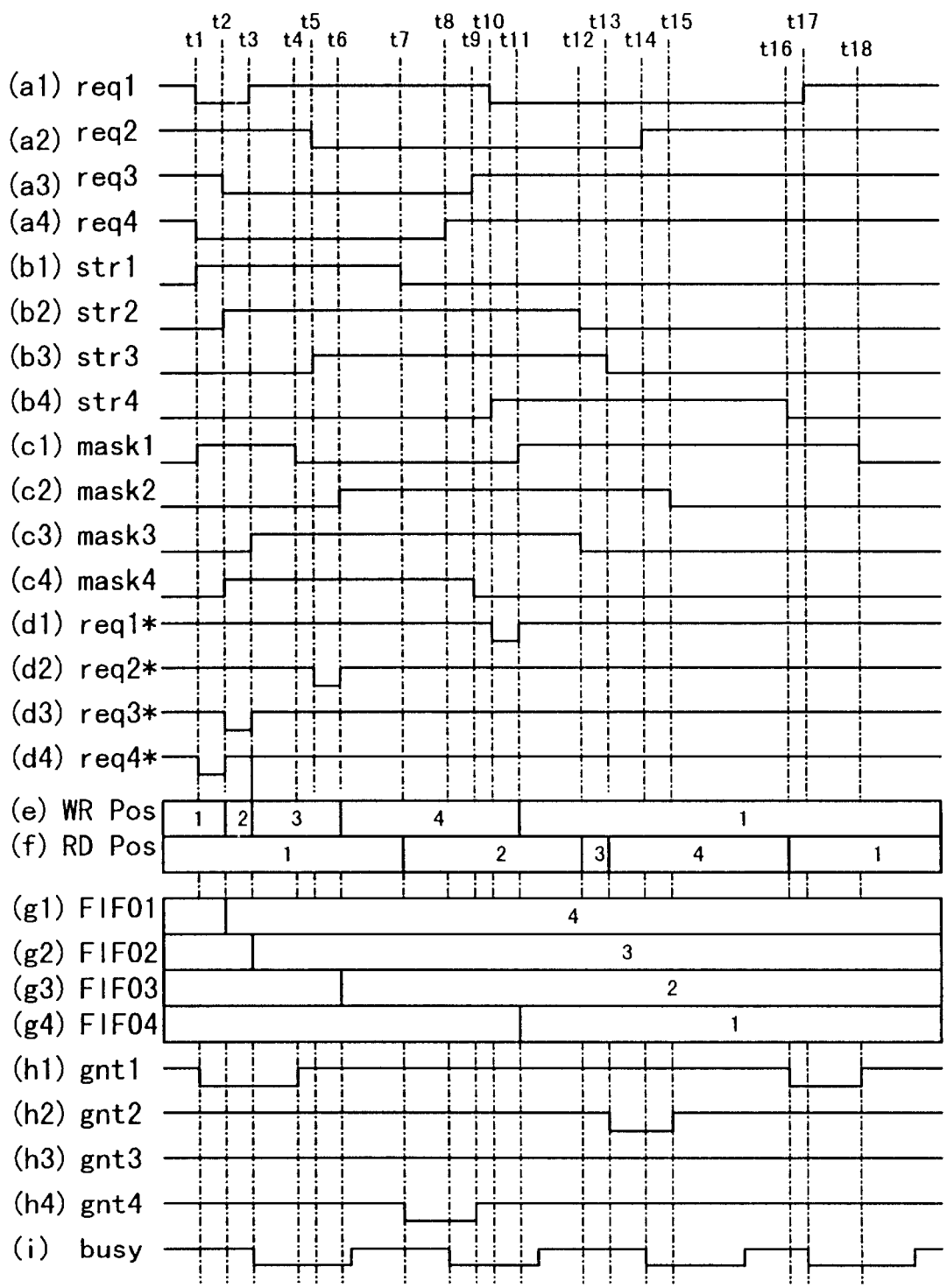
FIG. 7 is a timing diagram which shows typical activities of main signals in the system of FIG. 5.

Referring next to FIG. 7, the following section will explain how the bus arbiter operates in the second embodiment. Note again that bus request signals (a1) to (a4), masked bus request signals (d1) to (d4), bus grant signals (h1) to (h4), and bus busy signal (i) are all active-low signals.

At time t1, two processor modules P1 and P4 assert their bus request signals req1 (a1) and req4 (a4). It is assumed here that no pending request is stored in the FIFO memory 23. In response to these conflicting bus requests, the bus grant generator 28 first grants the bus request signal req1 by returning the corresponding bus grant signal gnt1 (h1) to the processor module P1. This is because the state indication signal (j) from the pending request detector 26 is currently "0," meaning that the FIFO memory 23 is empty, and the bus request req1 has a smaller suffix number than the other bus request req4.

Upon receipt of the bus grant signal gnt1, the processor module P1 (not shown) asserts its bus busy signal busy (i) at time t3 and executes its bus cycle on the bus B1 (not shown). Since this bus grant signal gnt1 is sent to the mask signal generator 22 as a masking condition, the mask signal generator 22 activates its corresponding mask signal mask1 (c1) for use in the bus request masking unit 21. As a result, the masked bus request signal req1* (d1) appears to be inactive, although the original bus request signal req1 (a1) is still in active state.

The remaining bus request signal req4, on the other hand, is entered to the FIFO memory 23 since it is not masked by the bus request masking unit 21. More specifically, the bit #4 of a new data word is set to "1" to represent the pending bus request req4, and this data word is written into an address of the FIFO memory 23 that is specified by the write address generator 24. Since the write address (e) is "1" at this moment, the pending request req4 is stored as part the first data word FIFO1 (g1) of the FIFO memory 23 as shown in FIG. 7. The write address generator 24 then increments its write address output (e) by one at time t2, when the bus request masking unit 21 negates the masked bus request req4*. The read address (f) supplied by the read address generator 25 is still "1" at this stage, the selector 27 thus chooses the first data word FIFO1 (g1), whose bit #4 is set to "1," and sends it to the bus grant generator 28. When the processor module P1 finishes its bus cycle and negates its bus busy signal at time t6, the bus grant generator 28 detects this event and asserts the next bus grant signal gnt4 at time t7, since the bit #4 of the selector 27's output indicates that the processor module P4 has been requesting the bus. With this gnt4, the processor module P4 activates its bus busy signal busy (i) at time t8, thus starting to use the bus B1. The activated bus grant signal gnt4 also causes the read address generator 25 to increment its read address output by one. Accordingly, the read address (f) is changed from "1" to "2" at time t7.

Referring back to time t2, the processor module P3 asserts its bus request signal req3. The bus arbiter of FIG. 5 puts this request into the second position of its request queue, because the requested bus is busy and there is another pending request (i.e., req4) in the queue. More specifically, the bus request signal req3 is fed to the FIFO memory 23 through the bus request masking unit 21 and then stored at its address "2," which is illustrated as FIFO2 (g2) in FIG. 7. This data word containing req3 arrives at the input of the bus grant generator 28 at time t7. To process this new request signal, the bus grant generator 28 attempts to assert the corresponding bus grant signal gnt3 at the time between t11 and t12 when the processor module P4 releases the bus B1. The bus request signal req3, however, has been negated at time t9 before it is granted, meaning that the request req3 in the queue is no longer valid. Accordingly, the bus grant generator 28 skips this void request req3 without activating gnt3.

FIG. 7 further illustrates that the bus request signals req2 and req1 are activated at time t5 and t10, respectively, and that their corresponding bus grant signals gnt2 and gnt1 are returned at times t13 and t16, respectively. Consequently, the processor modules P2 and 20 P1 assert their respective busy signals (i) at times t14 and t17, before starting to use the bus B1.

Although not shown in the timing diagram of FIG. 7, two or more processor modules may request the same bus at the same time, when the FIFO memory 23 stores some pending bus requests. In such a case, the FIFO memory 23 receives a data word in which a plurality of bits representing the bus request signals are set to "1." This data word is supplied to the bus grant generator 28 through the selector 27, and the bus grant generator 28 grants those pending requests in a sequential manner, from LSB to MSB, by activating their respective bus grant signals.

Suppose, for example, that three bus request signals req1, req2, and req4 are asserted when there is another pending request in the FIFO memory 23. In this case, a new data word whose bits #1, #2, and #4 are set to "1" will be written into the FIFO memory 23. When this data word is received from the selector 27, the bus grant generator 28 first activates gnt1. It then outputs gnt2, and lastly, gnt4.

Furthermore, it can happen that three or more requesters asserts their bus request signals exactly at the same time, when the FIFO memory 23 is empty. In such a case, the bus grant generator 28 returns a bus grant signal to the requester having the smallest suffix number among them. Because the granted request signal is then masked by the bus request masking unit 21, the FIFO memory 23 receives a data word representing only the remaining bus requests. Such a data word, which may have two or more active bits, is read out of the FIFO memory 23 and sent to the bus grant generator 28. The bus grant generator 28 processes each active bit, from LSB to MSB, in the same way as discussed above.

For example, consider such a situation where three bus request signals req1, req2, and req4 are asserted simultaneously, while the FIFO memory 23 is empty. In this case, the bus grant generator 28 immediately activates gnt1, and accordingly, the bus request masking unit 21 prevents the bus request signal req1 from reaching the FIFO memory 23. As a result, the data word to be written into the FIFO memory 23 will exhibit only two active bits #2 and #4. When this data word is received from the selector 27, the bus grant generator 28 first activates gnt2 and then gnt4.

Figure 8:
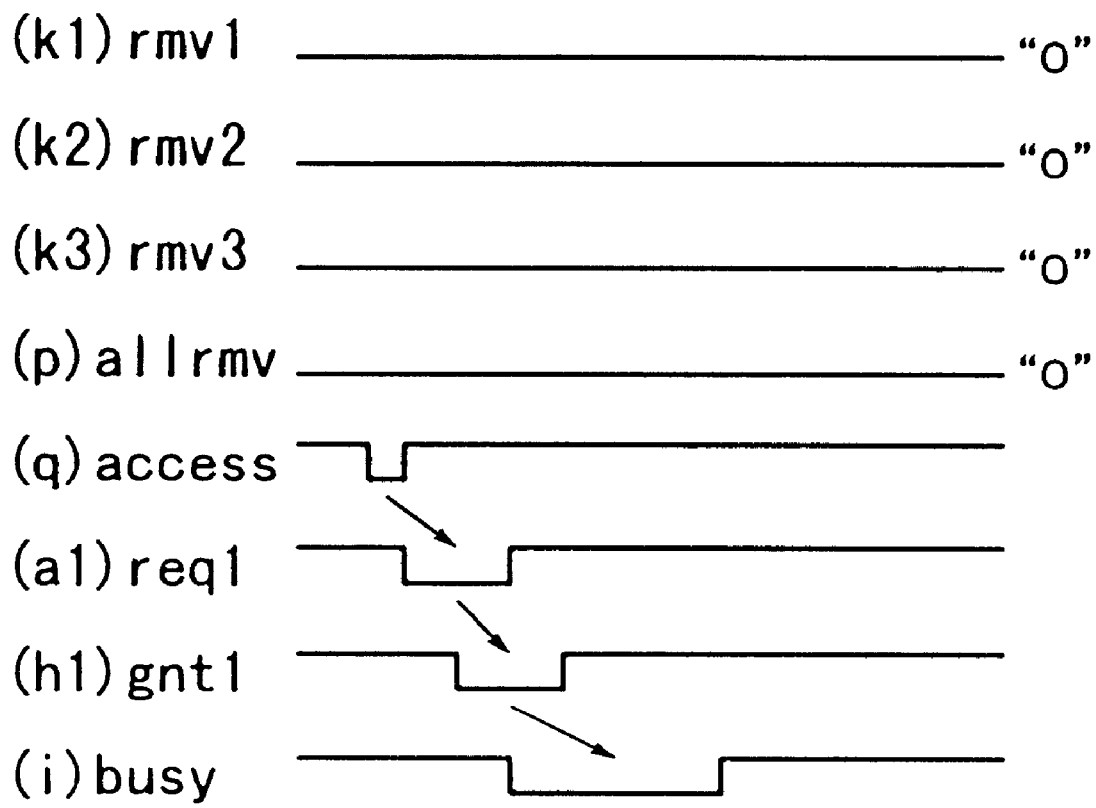
FIGS. 8 and 9 are timing diagrams which show the operation of a module monitor in the system of FIG. 5.
Figure 9:
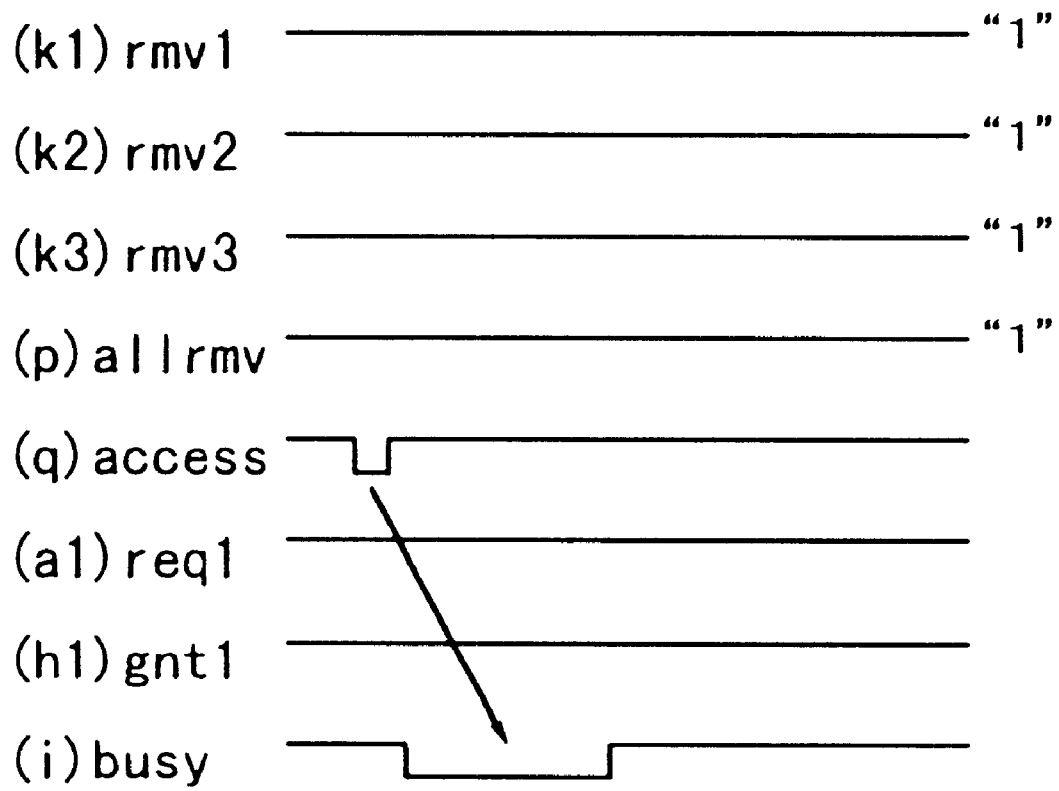

Referring now to FIGS. 8 and 9, the next section will describe the operation of the module monitor 15 shown in FIG. 5.

FIG. 8 is a timing diagram which shows how the module monitor 15 will work in the second embodiment, particularly when all processor modules P1 to P4 are mounted. Here, the module monitor 15 integrated in the processor module P4 receives module status signals rmv1 (k1) to rmv3 (k3). As FIG. 8 shows, these three signals are all inactive ("0") in this situation. The module monitor 15 has another output signal, named "allrmv," to indicate the absence of processor modules. That is, the signal allrmv (p) stays inactive when at least one processor module P1, P2, or P3 is mounted.

When the signal allrmv is inactive, the selector 29 selects the bus grant signal gnt4 supplied from the bus grant generator 28 and provides it to the bus busy generator 30. When the bus grant signal gnt4 becomes active, the bus busy generator 30 asserts its own bus busy signal to indicate that the processor module P4 has gained the access right.

Upon receipt of an access request (q) from the processor module P4, the bus request generator 20 activates the bus request signal req4 (a1), since it operates in a normal mode as long as the signal allrmv is inactive. The aforementioned bus arbitration process applies to this situation, thus causing the bus grant generator 28 to produce a bus grant signal gnt4 (h1) if the other processors P1 to P3 have no request for the bus B1. The bus busy generator 30 then asserts its bus busy output signal (i), which permits the processor module P4 to use the bus B1.

Referring now to FIG. 9, the next section will describe the operation of the module monitor 15 when the processor modules P1 to P3 are not mounted.

FIG. 9 is a timing diagram which shows how the module monitor 15 operates in the second embodiment, particularly when all processor modules other than P1 are absent. Here, the module monitor 15 integrated in the processor module P4 receives module status signals rmv1 (k1) to rmv3 (k3). As FIG. 9 shows, these three signals are all active ("1") in this situation. The module monitor 15 then activates the signal allrmv (p) to indicate the absence of three processor modules P1 to P3.

With the signal allrmv being activated, the selector 29 selects the access request signal (q) of the processor module P4 and supplies it to the bus busy generator 30. When the access request signal becomes active, the bus busy generator 30 immediately asserts its own bus busy signal output (i), declaring that the processor module P4 has gained the access right. The activated allrmv signal, on the other hand, disables the bus request generator 20.

Unlike the case of FIG. 8, the access request (q) from the processor module P4 will directly make the bus busy generator 30 assert its busy signal (i). The term "directly" is used here to mean that the access request to the bus B1 is immediately granted without bus arbitration. That is, the processor module P4 needs not to wait for the bus grant signal gnt4 to be returned from the arbitration logic, but can use the bus B1 immediately.

In the above-described second embodiment, the module monitor 15 is employed to check whether the processor modules P1 to P3 are mounted. The bus arbiter is designed to assert the bus busy signal immediately in response to each access request from the processor module P4 when all the other processor modules are absent. That is, the present invention permits the processor module P4 to quickly execute its memory access without bus arbitration processes in this particular single processor configuration. Although the second embodiment has been described under the assumption that the data processing system comprises at most four processor modules, the present invention is not restricted to this specific number of modules. It is obviously possible to construct like systems with two, three, five or any other number of processor modules.

The above discussion is summarized as follows. According to the present invention, the proposed data processing system comprises: (a) one or more processor modules; (b) a plurality of memories being respectively mapped onto a plurality of areas defined in a memory space; (c) a plurality of buses disposed between the processor modules and the memories, each allowing the processor modules to make access to at least one of the memories; and (d) a bus arbiter which accepts access requests from the processor modules to the memories, checks the availability of each bus that should be used to reach the requested memories, and grants the access requests. This system configuration will reduce the traffic load of each bus, because the processor modules are expected to use different busses to make access to different portions of their shared memory space. As a result, the total system performance will be increased.

The foregoing is considered as illustrative only a of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing system,
   one or more processor modules, each module having a processor for executing a program;
   a plurality of memories which are respectively mapped onto a plurality of areas defined in a memory space;
   a plurality of buses disposed between said one or more processor modules and said plurality of memories, each bus allowing said one or more processor modules to make access to at least one of said plurality of memories;
   a bus arbiter which accepts an access request from one of said processor modules for access to one of said memories, checks availability of each of said plurality of buses that lies between the requesting processor and the requested memory, and grants the access request when one of said buses is found by said checking to be available for the requesting processor to reach the requested memory;
   a module monitor, coupled to said one or more processor modules and said bus arbiter, to monitor whether each of said one or more processor modules is present or absent; and
   a disabling unit which disables the operation of said bus arbiter when said module monitor has found that only one of said one or more processor modules is present in the data processing system.

2. The data processing system according to claim 1, further comprising:
   a control module to control peripheral devices; and
   a memory-mapped I/O, mapped on a part of the memory space of said plurality of memories, to allow said one or more processor modules to transfer data to/from said control module.

3. The data processing system according to claim 1, wherein said bus arbiter grants the access requests on a first-come first-served basis, when the access requests made by two or more of the processor modules are targeted to the same bus.

* * * * *